United States Patent [19]
Clapsaddle, Jr.

[11] 3,828,878
[45] Aug. 13, 1974

[54] VEHICLE POWER TAKE-OFF ASSEMBLY
[75] Inventor: George S. Clapsaddle, Jr., Conrad, Iowa
[73] Assignee: Clapsaddle Sales and Service Inc., Whitten, Iowa
[22] Filed: Jan. 22, 1973
[21] Appl. No.: 325,365

[52] U.S. Cl............. 180/53 FE, 74/15.63, 417/231
[51] Int. Cl........................................... B60k 25/02
[58] Field of Search...... 180/53 FE, 53 R; 74/15.63, 74/15.6, 11; 417/231

[56] References Cited
UNITED STATES PATENTS

| | | | |
|---|---|---|---|
| 1,648,128 | 11/1927 | Jaeger | 180/53 FE |
| 1,924,466 | 8/1933 | Smith | 180/53 FE |
| 2,046,103 | 6/1936 | Austin | 180/53 FE |
| 2,821,868 | 2/1958 | Gregory | 180/53 FE |
| 2,940,534 | 6/1960 | Chattin | 180/53 R |
| 2,964,959 | 12/1960 | Beck et al. | 180/53 FE X |
| 3,002,579 | 10/1961 | Mihal | 180/53 FE |

Primary Examiner—Kenneth H. Betts
Attorney, Agent, or Firm—Rudolph L. Lowell

[57] ABSTRACT

The power take-off assembly is compact and adapted for installation on the front end of a vehicle engine and within the engine compartment. The assembly is directly connected to the engine crankshaft and includes a driven rotary power unit, such as a hydraulic pump, the operation of which is controlled independently of and without interruption of engine operation.

4 Claims, 8 Drawing Figures

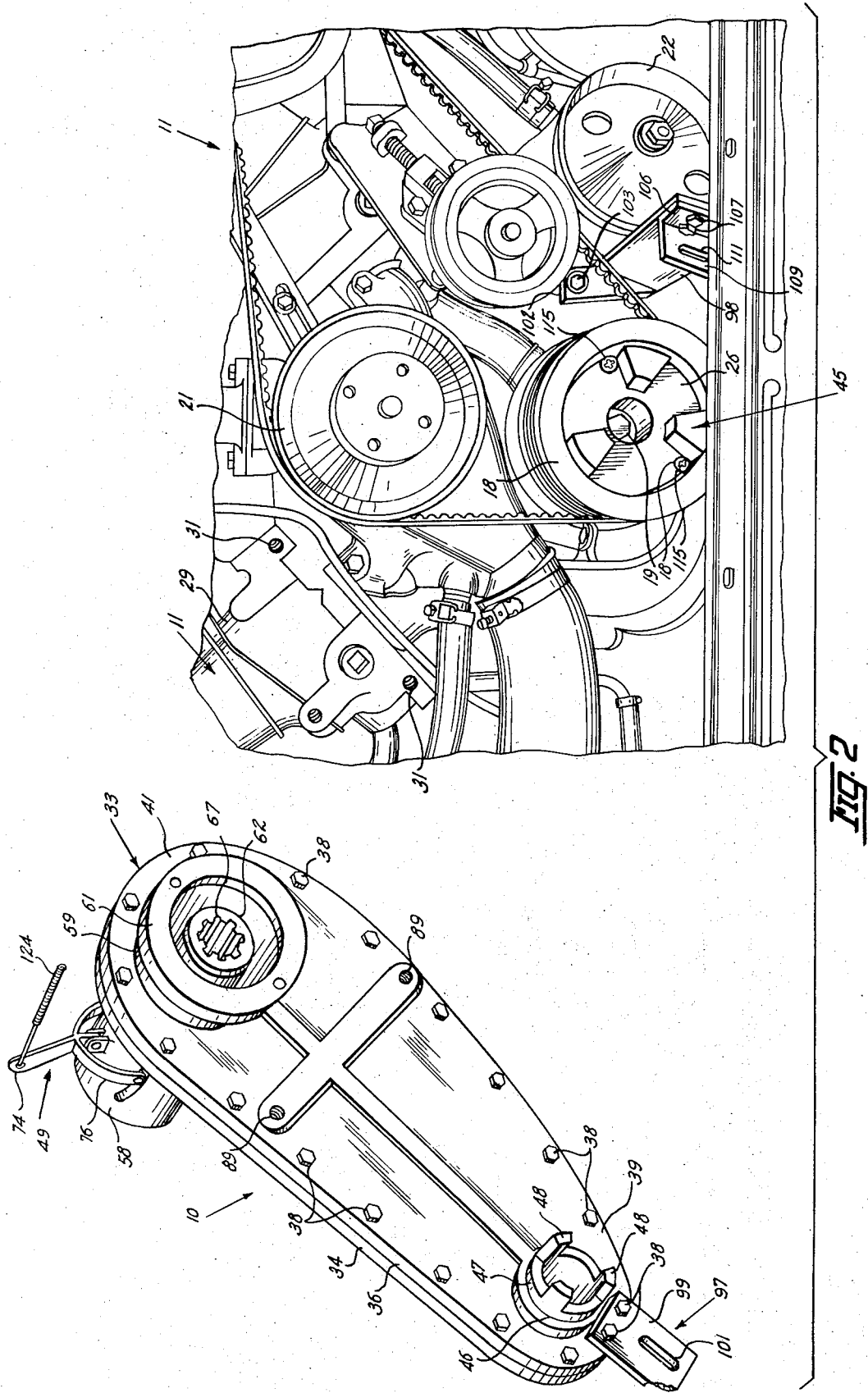

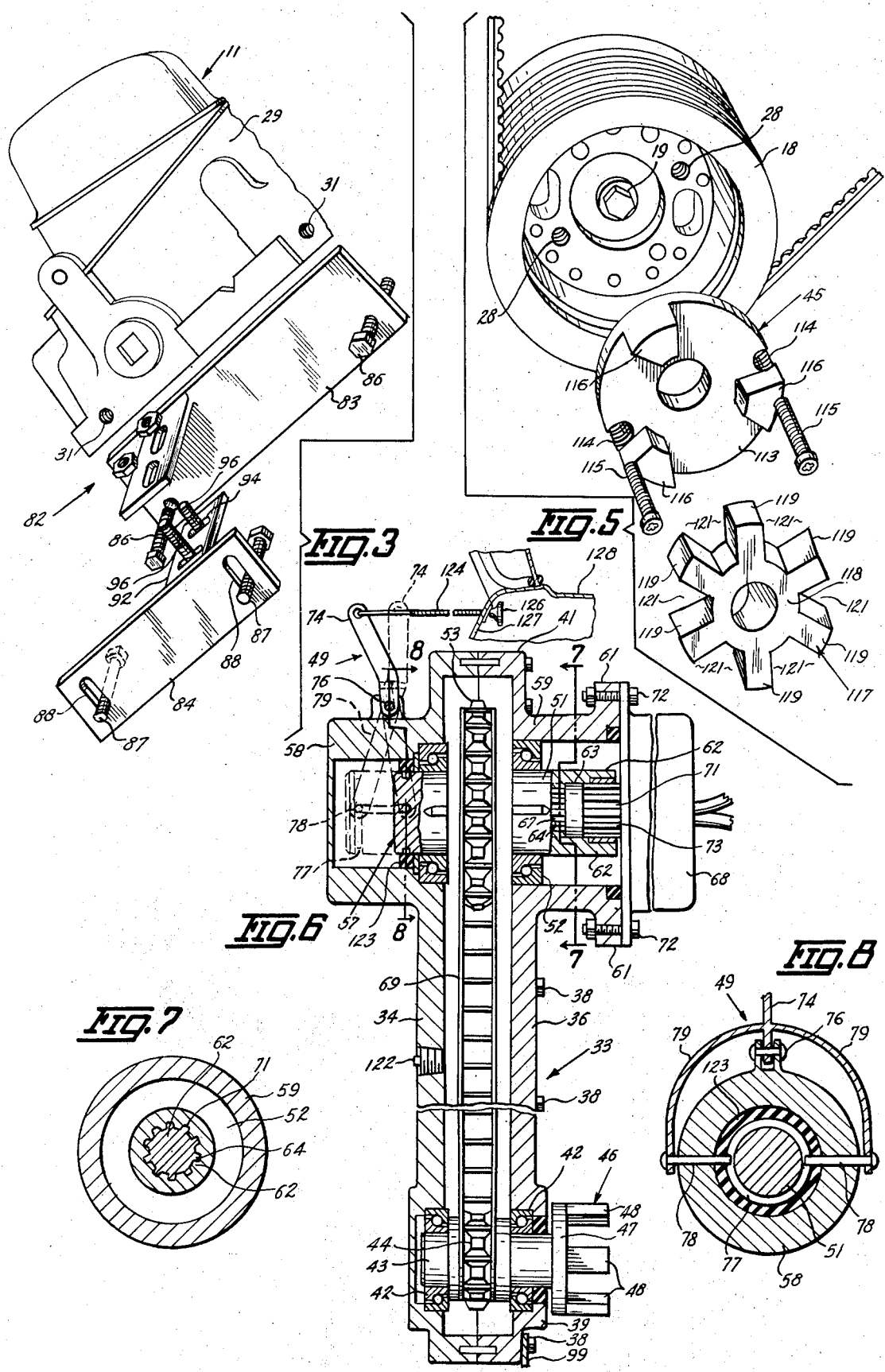

3,828,878

VEHICLE POWER TAKE-OFF ASSEMBLY

BACKGROUND OF THE INVENTION

Many trucks now in use for highway or road work are adapted to carry hydraulically operated equipment such as snow and scraper blades, winches, conveyor drives and the like. The pump for operating this type equipment is usually driven from the forward end of the engine crank shaft and is mounted on the front bumper forwardly of the engine radiator. This manner of installing the pump generally requires that a hole be cut through the engine radiator to receive a telescopic power take-off shaft for connecting the pump to the front end of the engine crank shaft. Installations of this type are costly due to the time required for installing the pump and the permanent damage or defacement made to the original equipment. Additionally, because of the pump and drive assembly being mounted on both the engine and vehicle chassis, which are relatively movable during engine operation, this type of drive is subject to appreciable wear.

SUMMARY OF THE INVENTION

The power take-off assembly and hydraulic pump are a unit package that is readily mounted on the front end of the vehicle engine at a position between the engine and the engine radiator without any impairment or defacement of original equipment. Being attached to and movable with the engine as a part thereof appreciably increases the service life of the assembly by reducing working tolerances in the coupling connection between the engine and power take-off assembly. The assembly is located entirely within the engine compartment for protection against accidental bumping damage along with simplifying the mounting of the hydraulically operated attachments on the front end of the vehicle. The power transmission mechanism of the assembly is in continuous driven engagement with the engine for concurrent operation with the engine. However, the operation of the hydraulic pump is controlled by a clutch means that forms part of the assembly. The manually operated actuator for the clutch means is located in the driver's compartment of the vehicle so that pump operation may be started and stopped while the vehicle engine is in operation.

BRIEF DESCRIPTION OF THE DRAWINGS

FIG. 2 is a perspective view of the front side of the engine, and of the rear side of the power take-off assembly for the purpose of showing the portions thereof that are connected together in the mounting of the assembly on the engine;

FIG. 3 is an exploded perspective view showing an upper mounting bracket for the assembly;

FIG. 5 is an exploded perspective view of that part of the engine to power take-off coupling unit that is carried on the engine;

FIG. 6 is a longitudinal sectional view of the power take-off assembly; and

FIG. 7 and 8 are sectional detail views taken on the lines 7—7 and 8—8, respectively, in FIG. 6.

DETAILED DESCRIPTION OF THE INVENTION

Figure 1:
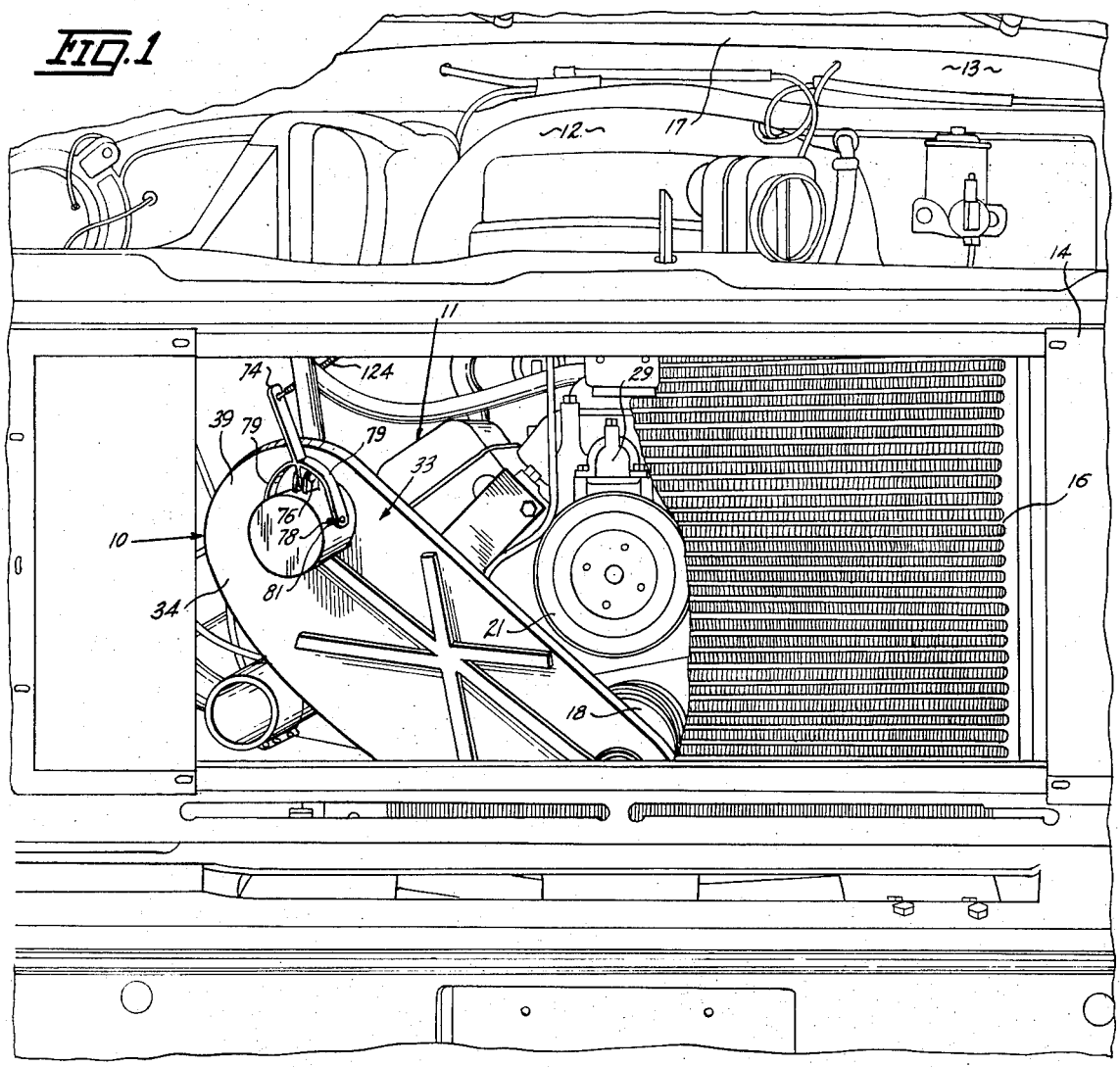
FIG. 1 is a front elevational view of a vehicle engine compartment with a portion of the engine radiator broken away to more clearly show the assembly of this invention mounted on the engine.

With reference to the drawings the power take-off assembly of this invention, indicated generally at 10, is shown in FIG. 1 installed on an engine 11 for a motor vehicle having an engine compartment 12. As is usual the compartment 12 has a rear or fire wall 13 and a front wall or grille 14 located forwardly of the liquid cooling or engine radiator 16. The vehicle cowl is designated as 17. As illustrated, the engine hood or top wall of the compartment 12 is not shown and a portion of the radiator is removed to show the location of the power take-off assembly 10 within the engine compartment and between the engine 11 and the radiator 16. The engine 11 (FIG. 2 is provided at its front end with a multi-belt power pulley 18 carried on the engine crank shaft 19. The power pulley 18 is belt connected in a driving relation with a fan pulley 21, oil pump pulley 22 and a pulley 23 for a power steering mechanism (not shown).

The power pulley 18 (FIG. 2) is of a usual type and has a peripheral rim extended axially outwardly from the web or body section 26 of the pulley 18. The web 26 is formed with a pair of diametrically opposed tapped holes 28. Additionally, the engine block 29 for several commercially available type trucks is provided on its front side with upper tapped holes 31 for the mounting of optional accessory equipment. Where these holes 31 are not factory provided they may be readily formed in the installation of the take-off assembly 10 on the engine 11. To complete the mounting of the power take-off assembly 10 on the engine requires only the forming of a lower tapped hole (not shown) formed in the engine block 29, at a position between the power or drive pulley 18 and the power steer pulley 23 for receiving a threaded screw 103. It is to be noted that only the tapped upper holes 31, the lower tapped hole, and the tapped holes 28 in the power pulley 18 are required in the mounting of the power take-off assembly 10 on the engine block 29. Thus, when the assembly 10 is removed the vehicle is not in any way defaced in appearance or impaired for normal use.

The power take-off assembly 10 (FIGS. 2 and 6) includes a flat elongated hollow housing 33 comprised of a pair of mating sections 34 and 36 secured together at their perimetrical portions by screws 38. As shown in FIG. 2, the housing is of a generally oval shape in side elevation and is of a gradually increasing size from its lower end 39 to the upper end 41 thereof. Extended transversely of the housing and rotatably supported in bearings 42 (FIG. 6) at the lower end of the housing 33 is a stub or drive shaft 43 that has one end projected laterally outwardly from the housing section 36 to be hereinafter referred to as the inner housing section. Supported on the stub shaft 43 and within the housing 33 is a spur gear 44 and mounted on the projected end of the shaft 43 is a coupling member or adaptor 46. The adaptor 46 (FIGS. 2 and 6) has a hub section 47 rigidly secured to the stub shaft 43 and a plurality of fingers or abutments 48, illustrated as three in number, extended axially outwardly from the hub 47 in a circumferentially spaced relation.

A clutch unit 49 (FIG. 6) carried within the upper end 41 of the housing 33 includes a slide or driven shaft 51 extended transversely of the housing and rotatably supported in bearing units 52 mounted in the housing sections 34 and 36. A spur gear 53 on the shaft 51 is held between the bearing units 52 against movement axially of the slide shaft 51. Axial movement of the shaft 51 relative to the spur gear 53 is provided by an elongated key 56 on the shaft 51 which is guidably movable within an associated keyway (not shown) formed in the hub of gear 53.

The slide shaft 51 has what will be termed an actuated end section 57 enclosed within an annular pocket extension 58 formed integral with and projected laterally outwardly from the outer housing section 34. Laterally opposite the extension 58 and projected outwardly from the inner housing section 36 is an annular open extension 59 which terminates in an annular flange 61. The shaft 51 has what will be called a clutch end 62 located within the open extension 59. This clutch end 62 has an axially extended bore 63, the inner portion of which is of a reduced diameter relative to its outer portion. The side wall of the inner portion of the bore 63 is formed with a plurality of axially extended circumferentially spaced internal splines 64. The side wall of the outer portion of the bore 63 is continuous with the bottom walls of the grooves 67 formed between adjacent ones of the internal splines 64.

The clutch unit 49 (FIGS. 6 and 7) functions to connect and disconnect a hydraulic pump unit 68 relative to the slide shaft 51 which is in a continuously driven relation with the stub shaft 43 through the spur gears 43 and 53 and interconnecting chain 69. The pump 68 includes a main shaft 71 received in coaxial alignment within the bore 63 of the slide shaft 51 when the pump is secured as by screws 72 to the flange 61 of the extension 59. That portion of the pump shaft 71 within the bore 63 has its peripheral surface formed with circumferentially spaced external splines 73 corresponding to the internal spines 64 so as to be movable into and out of locking engagement with the internal splines on axial movement of the slide shaft 51 relative to the pump shaft 71. When the splines 64 and 73 are disengaged, the outer surface of the external splines 73 are in bearing engagement with the outer enlarged portion of the bore 63.

To axially move the shaft 51 relative to the pump shaft 71 a pivoted yoke or operating lever 74 (FIGS. 6 and 8) is pivoted at 76 on the pocket extension 58 for pivotal movement in a plane extended axially of the shaft 51. The actuated end 57 of the slide shaft is formed with an annular groove 77 for receiving in guidable engagement a pair of diametrically opposite pins 78 extended inwardly toward each other from the leg sections 79 of the yoke member 74. The legs 79 are arranged in a straddling relation about the pocket extension 58 which is formed with arcuate slots 81 through which the pins 78 extend for reception within the groove 77. It is seen, therefore, that in response to a pivotal movement of the yoke member 74 that the internal splines 64 in the shaft bore 63 are axially moved into and out of engagement with the external splines 73 on the pump main shaft 71.

In the installation of the power take-off assembly 10 with the vehicle engine 11, the engine radiator 16 is removed, as is also the engine fan (not shown) so as to give substantially unobstructed access to the forward side of the engine. An upper bracket structure 82 (FIG. 3) includes an engine attachable plate 83 and a plate 84 connectible to the inner housing section 36. The plate 83 is secured to the engine block 29 by screws 86 extended therethrough for threaded engagement within the upper tapped holes 31. The plate 84 is attached to the inner housing section 36 by screws 87 inserted through elongated holes 88 therein for threaded engagement within the tapped holes 89 (FIG. 2) formed in and spaced transversely of the housing section 36. The plate 83 has a laterally extended connecting arm 91 (FIG. 3) for positioning in a back to back relation with a corresponding connecting arm 92 on the plate 84, when the plates 83 and 84 are arranged opposite each other. Plate 91 has elongated openings 93 arranged at right angles to corresponding elongated openings 94 in the arm 92. The arms 91 and 92 are secured together by bolt assemblies 96 extended through corresponding aligned holes 93 and 94.

Figure 4:
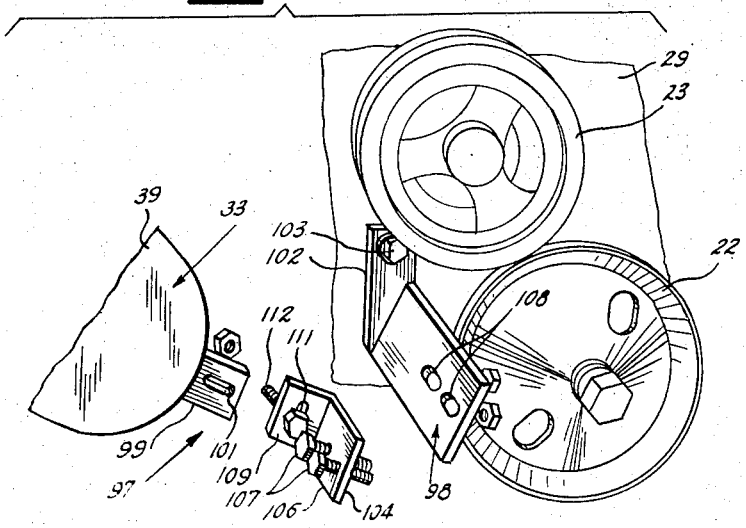
FIG. 4 is an exploded perspective view showing a lower mounting bracket for the engine.

The lower end 39 of the housing 33 is secured to the engine block 29 by a lower bracket structure 97 (FIG. 4), which includes an engine mounted arm 98 and a hanger plate 99 projected axially outwardly from the housing lower end 39. The hanger 99 (FIG. 6) is secured to the housing 33 by a pair of the screws 38 which secure together the housing sections 34, 36 and is formed with an elongated hole 101 (FIG. 4). The arm member 98 is integrally formed with an attachment portion 102 arranged in a plane normal to the plane of the arm 98 and formed with a hole (not shown) for receiving a screw 103 which is threadably engageable within the lower tapped hole (not shown) in the engine block 29. When thus secured to the engine block it is seen that the arm 98 projects forwardly therefrom as shown in FIG. 4. The hanger plate 99 and arm 98 are secured together by a connecting member 104 of a right angle shape in transverse cross section. One leg 106 of the member 104 is secured by bolt assemblies 107 inserted through such leg and associated elongated holes 108 formed in the arm 98. The other leg 109 of the connector 104 is formed with an elongated hole 111 and is secured to the hanger 99 by a bolt assembly 112 extended through the holes 111 and 101.

The stub shaft 43 (FIGS. 5 and 6) is coupled in a driven relation with the engine crank shaft 19 by a coupling means which includes the coupler 46 on the assembly 10 and a coupler 45 attachable to the shaft 19. Referring to FIG. 5, the coupler member 45 has a body member 113 of a disc shape formed with a pair of diametrically opposite holes 114 corresponding to the tapped holes 28 in the power pulley 18. Screws 115 inserted through the holes 114 and threadably engageable within the tapped holes 28 rigidly secure the coupling member 45 to the power pulley 18 for rotation therewith. Projected axially and forwardly from the body section 113 are three finger or abutment members 116 corresponding to and circumferentially spaced in all ways similar to the abutment members 48 on the coupler adaptor 46.

The coupler members 45 and 46 are connected together by an intermediate coupling member 117 (FIG. 5) integrally formed with a hub section 118 and radially extended circumferentially spaced fingers 119. The spaces 121 between adjacent ones of the fingers 119 are of a shape and size corresponding in all ways to the shape and size of the abutment members 48 and 116 on the coupling members 46 and 45, respectively. The fingers 119 on the intermediate coupling member 117 are six in number and a space between adjacent fingers 119 is approximately about one-half the size of a space between adjacent abutment members on the coupling members 45 and 46. Thus with the abutment members 116 of the coupling member 45 received within alternate ones of the spaces 121 of the intermediate coupling member 117 the abutment members 48 of the coupling member 46 are received within the remaining alternate spaces 121 not occupied by the abutment members 116. It is seen, therefore, that the intermediate coupling member 117 is located between the hub portions 47 and 113 of the coupling member 46 and 45, respectively, with the fingers 119 in interlocked engagement with the abutment members 48 and 116. The coupling member 117 is composed of a plastic material and provides for a connection of the coupling member 45 and 46 without requiring an exact axial alignment between engine crank shaft 19 and stub shaft 43. By thus accommodating any minor misalignments between the stub shaft 43 and engine shaft 19, the service life of the assembly 10 is appreciably increased.

By virtue of the articulated construction of the mounting bracket structures 82 and 97, in conjunction with the associated elongated bolt receiving holes in certain parts of such structures, the housing 33 is readily adjusted to locate the engine shaft 19 and stub shaft 43 of the assembly 10 in substantial axial alignment. In this respect it will be understood that the engine crank shaft 19 in most vehicles is inclined upwardly in a forward direction so that the housing 33 in an adjusted position is tilted rearwardly to accommodate the inclination of the crank shaft. On completion of the mounting of the power take-off assembly 10 on the engine 11 the engine radiator 16 and radiator fan (not shown) are replaced. With housing 33 being of a flat elongated construction, the assembly 10 is receivable between the front of the engine 11 and radiator 16 without interfering in any way with engine operation. Additionally, the location of the hydraulic pump 68 at the upper end 41 of the housing 33 locates the motor or pump 68 within the engine compartment 12 at a position forwardly of the engine and the working parts thereof.

In the operation of the power take-off assembly 10, the housing 33 is initially filled with oil through the fill opening 122 (FIG. 6) so as to self-lubricate the gears 44, 53 and the gear chain 69. To prevent any leakage of oil through the pin openings 81 formed in the pocket extension 58 an oil seal 123 is provided adjacent the bearing unit 52 located within the outer housing section 34. In the operation of the hydraulic pump 68 the operating lever 74 is actuated by a Bowden wire 124 which has a manually actuated knob 126 carried on the vehicle instrument panel 127 within the vehicle cab 128. On movement of the operating lever 74 to its dotted line position shown in FIG. 6, the slide shaft 51 is moved to its dotted line position wherein the internal splines 64 are disengaged from the external splines 73 on the pump shaft 71. On actuation of the operating lever 74 to its full line position the slide shaft 51 is moved to a corresponding full line position, as shown in FIG. 6, to engage the pump shaft 71 in a driven relation with the slide shaft 51. Since the power take-off assembly is in a continuous driven engagement with the engine crank shaft 19 it is seen that the control of the hydraulic pump 68 takes place without any interruption in engine operation.

Although the invention has been described with respect to a preferred embodiment thereof, it is to be understood that it is not to be so limited since changes can be made therein which are within the full intended scope of this invention as defined by the appended claims.

I claim:

1. A power take-off assembly mountable within a vehicle engine compartment for an engine having a transversely extended radiator located adjacent the front end of the compartment and a crank shaft projected forwardly from the front end of the engine toward the radiator, said assembly comprising:
   a. an elongated flat hollow housing member,
   b. a pair of shafts rotatably supported at opposite ends of said housing, each shaft having one end thereof projected outwardly from one side of said housing,
   c. a pair of gears within said housing corresponding to and mounted on said shafts,
   d. an endless chain means in continuous meshed engagement with said pair of gears,
   e. means for mounting said housing member in an upright position on the front end of said engine and rearwardly of the radiator with the one side of the housing member facing the engine and the one end of a first one of said shafts arranged in axial alignment with said crank shaft,
   f. coupling means for connecting the crank shaft in a driving relation with said first shaft,
   g. a hydraulic motor mounted on said housing adjacent the one end of the second one of said shafts, and
   h. means for releasably coupling said hydraulic motor in a driven relation with the one end of said second shaft.

2. The combination according to claim 1 wherein:
   a. said coupling means includes a first coupling member detachably mounted on said crank shaft and a second coupling member rigidly secured to said first shaft,
   b. each of said coupling members having a series of circumferentially spaced axially extended abutment portions projected outwardly from the adjacent sides thereof, and
   c. a third coupling member having a plurality of radially projected circumferentially spaced abutment fingers,
   d. said third coupling member interposed between and in axial alignment with said first and second coupling members with the abutment fingers thereof in interlocked engagement with the abutment portions on said first and second coupling members.

3. The combination according to claim 1 wherein:
   a. said hydraulic motor has a main shaft with an end section projected from the side thereof facing said housing, said end section having the outer peripheral surface thereof formed with a plurality of circumferentially spaced axially extended external splines, and
   b. said one end of the second shaft being of a cylindrical tubular shape having an axial bore with an inner portion of a reduced diameter relative to the outer portion thereof, said inner portion having the side wall thereof formed with a plurality of circumferentially spaced axially extended internal splines corresponding to said external splines,
   c. means mounting the gear on said second shaft for relative axial movement, and d. means for axially moving said second shaft relative to said main shaft to a first position wherein said splines are in interlocked engagement, and to a second position wherein the internal splines are withdrawn from said external splines and in bearing engagement with the side wall of said outer portion of the axial bore.

4. The combination according to claim 3 wherein:

a. said means for axially moving the second shaft includes an operating lever movably supported on said housing member, and b. means for moving said operating lever including an actuator member mounted in the operator compartment of the vehicle.

* * * * *